Nov. 13, 1923.
C. B. MILLS
1,473,827
FLUID COOLED BEARING
Filed April 4, 1918
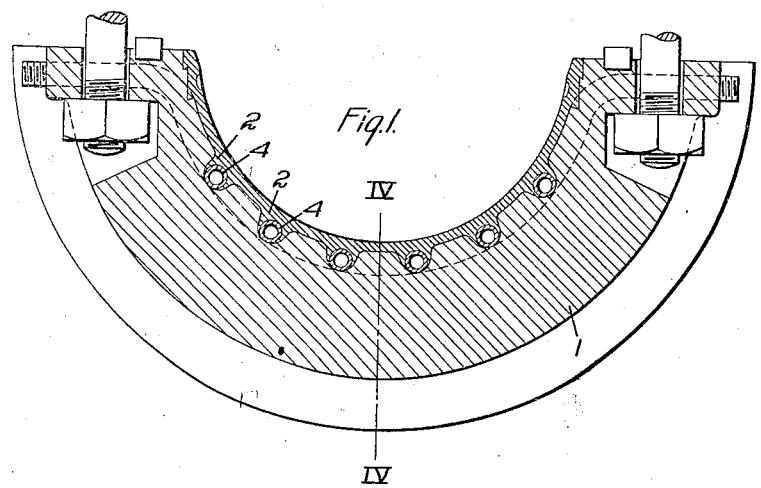
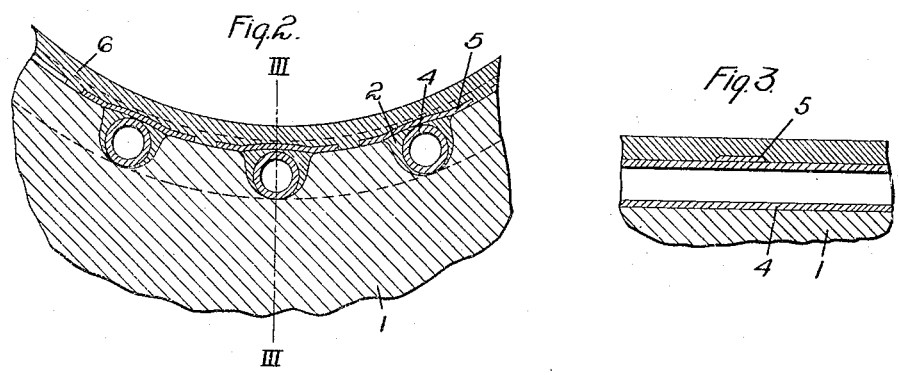
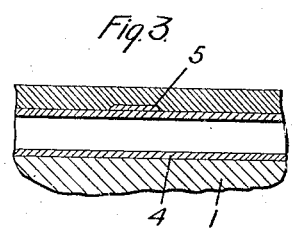
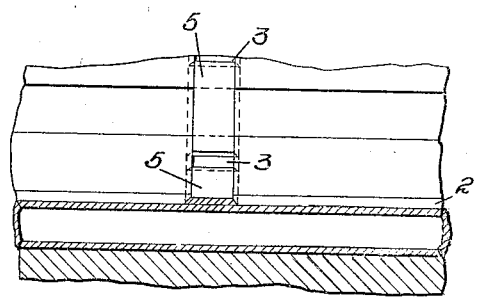
WITNESSES:
J. T. Wurmb.
F. A. Lind.
INVENTOR
Chester B. Mills.
BY
Wesley G. Carr.
ATTORNEY Patented Nov. 13, 1923.

1,473,827

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

FLUID-COOLED BEARING.

Application filed April 4, 1918. Serial No. 226,758.

*To all whom it may concern:*

Be it known that I, CHESTER B. MILLS, a citizen of the United States, and a resident of East McKeesport, in the county of Allegheny and State of Pennsylvania, have invented a new and useful Improvement in Fluid-Cooled Bearings, of which the following is a specification.

My invention relates to bearings adapted for use in relatively large machines and it has particular relation to fluid-cooled bearings of the composite type.

One object of my invention is to provide a fluid-cooled bearing in which the fluid-containing pipes shall be so positioned that the bearing shall not be weakened thereby and in which the cooling fluid shall come into direct contact with the bearing lining at the point at which the highest temperature occurs.

Another object of my invention is to provide a device which shall facilitate holding the fluid-containing pipes in position while the bearing-metal lining is being poured into position.

Heretofore, in fluid-cooled bearings, it has been customary to place a coil of pipe in a single large niche cut in the main bearing member and to pour the bearing metal over the coil to hold it in position. One objection to such a structure is that a large portion of the solid bearing must be removed in order to insert the pipe coil, which necessarily results in a weakened bearing at the point at which the greatest strain occurs, since the point of greatest strain and the point of highest temperature are the same. Also, difficulty has been experienced in holding the pipes in their proper position while the bearing metal is being poured. By my present invention, I provide a fluid-cooled bearing which is of substantially the same strength as a solid bearing. Also, a device is provided by which the pipes are held rigidly in place while the bearing metal is being poured.

Referring to the accompanying drawings, Fig. 1 is a cross-sectional view of the lower half of a bearing constructed in accordance with my invention; Fig. 2 is an enlarged detail sectional view of a portion of the bearing shown in Fig. 1; Fig. 3 is a sectional view taken along the line III—III of Fig. 2, and Fig. 4 is a view, partially in elevation and partially in section, taken along the line IV—IV of Fig. 1.

Referring more particularly to the drawings, I have shown a main bearing member 1 provided with sets of longitudinal and transverse grooves 2 and 3, respectively. Fluid-containing pipes 4 are located within the longitudinal grooves 2. The transverse grooves 3 are of dove tail cross-section, and similarly shaped wedges 5 are inserted therein to overlie the pipes 4, whereby said pipes are maintained in position. After the wedges have been placed in position, a lining 6, of bearing metal, is poured into the main bearing member 1 and serves to form an integral part of the main body member 1, the cooling pipes 4 and the wedges 5. The pipes and retaining wedges are previously tinned in order to cause the bearing metal, usually babbitt, to unite more firmly therewith and thereby provide a better heat-conducting connection.

From the foregoing description, it will be noted that the cooling fluid comes directly into engagement with the bearing metal and also that the bearing member is not materially weakened thereby, the cooling pipes being distributed over a considerable surface of the bearing.

While I have shown one form of my invention and described one application of the same, it will be obvious to those skilled in the art that it is not so limited but is susceptible of various minor changes and modifications within the scope of the appended claims.

I claim as my invention:

1. A fluid-cooled bearing comprising a main body member provided with a plurality of spaced grooves, fluid-containing pipes disposed in said grooves, and a layer of bearing metal integral with said main body member and providing a bearing surface thereon and adapted to hold said pipes in position in said grooves.

2. A fluid-cooled bearing comprising a main body member provided with spaced grooves, fluid-containing pipes disposed in said grooves, means disposed within said main body member to hold said pipes in position, and an additional means comprising a bearing metal lining for said main body member.

3. A fluid-cooled bearing comprising a main body member provided with spaced grooves, fluid-containing pipes disposed in said grooves, a removable member for retaining said pipes in position in said grooves, and an additional member comprising a bearing metal lining for said main body member.

4. A fluid-cooled bearing comprising a main body member provided with spaced grooves, fluid-containing pipes disposed within a portion of said grooves and means extending transversely to said grooves and in interlocking engagement with said body member for holding said pipes in position.

5. A fluid-cooled bearing comprising a main body member provided with two intersecting sets of grooves, fluid-containing pipes disposed in one set of said grooves and wedging members disposed within the other set of grooves for holding said pipes in position.

6. A fluid-cooled bearing comprising a main body member provided with two intersecting sets of grooves disposed at substantially right-angles to each other, fluid-containing pipes disposed within one set of said grooves and wedging members disposed within the other set of grooves for holding said pipes in position.

7. A fluid-cooled bearing comprising a main body member provided with longitudinal and transverse grooves, fluid-containing pipes disposed within said longitudinal grooves and wedges disposed within said transverse grooves to hold said pipes in said longitudinal grooves.

8. A fluid-cooled bearing comprising a main body member provided with longitudinal and transverse grooves, fluid-containing pipes disposed within said longitudinal grooves, and wedges disposed within said transverse grooves at the points at which the grooves intersect to hold said pipes in said longitudinal grooves.

9. A composite fluid-cooled bearing comprising a main body member and a bearing-lining member, said main body member being provided with longitudinal and transverse grooves, fluid-containing pipes disposed within said longitudinal grooves, and wedges disposed within said transverse grooves to hold said pipes in position, said bearing-lining member being so disposed within said main body member as to provide a bearing surface therein and to unite said main body member, said pipes and said wedges into an integral mass.

10. A segmental bearing member adapted to partially surround a shaft, comprising a main body member having a concave cylindrical surface, a piping assembly for conveying a cooling fluid, said cylindrical surface being grooved to receive said piping assembly in such manner that the latter is removable as a unit, and a layer of bearing metal covering said piping assembly within said grooved surface and providing a bearing surface.

11. A segmental bearing member adapted to partially surround a shaft, comprising a main body member having a concave cylindrical surface, a piping assembly for conveying a cooling fluid, said cylindrical surface being grooved to receive said piping assembly, means mechanically secured to said main body member for retaining said piping assembly in position, and a layer of bearing metal covering said piping assembly and said retaining means within said grooved surface and providing a bearing surface adapted to co-operate with the shaft, said piping assembly being removable radially from said concave cylindrical surface when said bearing metal layer and said retaining means are removed.

12. A segmental bearing member adapted to partially surround a shaft, comprising a main body member having a concave cylindrical surface, a piping assembly for conveying a cooling fluid, said cylindrical surface having grooved portions so shaped that said piping assembly may be placed therein as a complete unit, a retaining member removably secured over said grooved portions to hold said piping assembly in position, and an additional member comprising a bearing metal lining for said main body member.

In testimony whereof, I have hereunto subscribed my name this 18th day of March, 1918.

CHESTER B. MILLS.